United States Patent
Rossberg et al.

(10) Patent No.: US 8,959,048 B1
(45) Date of Patent: Feb. 17, 2015

(54) INDEX FOR SET EMPTINESS IN TEMPORAL DATABASES

(75) Inventors: Andreas Rossberg, Munich (DE); Ingo Walther, Munich (DE)

(73) Assignee: Google Inc., Mountain View, CA (US)

( * ) Notice: Subject to any disclaimer, the term of this patent is extended or adjusted under 35 U.S.C. 154(b) by 487 days.

(21) Appl. No.: 13/279,027

(22) Filed: Oct. 21, 2011

(51) Int. Cl.
G06F 17/30 (2006.01)

(52) U.S. Cl.
USPC ............ 707/607; 707/741; 707/746; 707/769

(58) Field of Classification Search
CPC .......... G06F 17/3061; G06F 17/30309; G06F 17/30613; G06F 17/30312; G06F 17/30619; G06F 17/30321
USPC ......... 707/607, 736, 737, 739, 741, 746, 766, 707/769
See application file for complete search history.

(56) References Cited

U.S. PATENT DOCUMENTS 5,263,156 A * 11/1993 Bowen et al. .......... 707/999.201
8,538,820 B1 * 9/2013 Migdal et al. ................. 348/153

* cited by examiner

*Primary Examiner* — Vincent F Boccio
(74) *Attorney, Agent, or Firm* — Birch, Stewart, Kolasch & Birch, LLP

(57) ABSTRACT

A temporal database system, method, and computer-readable storage medium in which a database is provided with sets of entities defined by initial tuples having a set ID, a unique timestamp, and a member increment. A write transaction is performed for sets of entities, wherein the write transaction designates the set by said set ID and produces an increment, wherein the increment is a number of entities to be added to or removed from the designated respective set of entities. New tuples including the set ID, the increment, and a new unique timestamp are created for the write transaction. Following the write transaction, an asynchronous compaction operation is performed on the new tuples. The compaction operation aggregates the increment of each new tuple into summary point counts. The compaction operation facilitates efficient queries without contention with write transactions.

45 Claims, 9 Drawing Sheets

FIG. 5

| setID | Valid time | entry | value |
|---|---|---|---|
| "Bigtown" | 1850 | Summary point count | 5 |
| "Bigtown" | 1980 | Summary point count | 1,700,000 |
| "Bigtown" | 1992 | increment | +4 |
| "Bigtown" | 1993 | increment | +2 |
| "Bigtown" | 1995 | increment | -4 |
| "Bigtown" | 2001 | increment | +1 |

| setID | Valid time | entry | value |
|---|---|---|---|
| "Smallville" | 1890 | Summary point | 1 |
| "Smallville" | 1950 | Summary point | 2400 |
| "Smallville" | 1991 | increment | -2100 |
| "Smallville" | 1992 | increment | +5 |
| "Smallville" | 1995 | increment | -305 |
| "Smallville" | 1999 | increment | +2 |
| "Smallville" | 2001 | increment | -1 |

FIG. 6

Read Transaction (query)

Was anyone living in Smallville in 1996?

Read from ("Smallville", 0) to ("Smallville", 1996) in reverse order

| setID | Valid time | entry | value |
|---|---|---|---|
| Smallville | 1995 | increment | -305 |
| Smallville | 1992 | increment | +5 |
| Smallville | 1991 | increment | -2100 |
| Smallville | 1950 | Summary point | 2400 |
| Smallville | 1890 | Summary point | 1 |

Sum increments back to first summary point

-305 + 5 - 2100 + 2400 = 0

Result: there was no one living in Smallville in 1996

FIG. 7A

Compaction

Compaction for set: Smallville, to time: 2000

Keep summary points that change between empty and non-empty

| setID | Valid time | entry | Value |
|---|---|---|---|
| Smallville | 1890 | Summary point | 1 |
| Smallville | 1995 | Summary point | 0 |
| Smallville | 1999 | Summary point | 2 |
| Smallville | 2001 | increment | -1 |

FIG. 7B

Read transaction (Query), after compaction

Was anyone living in Smallville in 1996?

Read from ("Smallville", 0) to ("Smallville", 1996) in reverse order

| setID | Valid time | entry | Value |
|---|---|---|---|
| Smallville | 1995 | Summary point | 0 |
| Smallville | 1890 | Summary point | 1 |

From Summary point 1995, count is 0

Result: there was no one living in Smallville in 1996

FIG. 8A

Parallel Transactions

Set X

| time | Trans A | Trans B |
|---|---|---|
| 1 | Start (+5) | Start (-59) |
| 2 | In progress | In progress |
| 3 | timestamp: (x, 3) +5 | In progress |
| 4 | Completion (commit) | In progress |

FIG. 8B

| time | Trans A | Trans B |
|---|---|---|
| 1 | Start (+5) | Start (-59) |
| 2 | In progress | Timestamp: (x, 2) -59 |
| 3 | timestamp: (x, 3) +5 | Completion (commit) |
| 4 | Completion (commit) | |

INDEX FOR SET EMPTINESS IN TEMPORAL DATABASES

BACKGROUND OF THE INVENTION

1. Technical Field

The following relates to an index for a database that supports transactions. The index maintains a history of the times that a set of entities is empty.

2. Discussion of the Related Art

Temporal database systems that support transactions enable storage and retrieval of historical data, including data that changes over time. Transactions can include, among other things, adding and removing entities (e.g., files) to or from sets (e.g. logical directories). As sets of entities evolve, some sets can become very large, and some sets can become empty.

Write transactions must adhere to the ACID principle, in which the transaction must be Atomic, Consistent, Isolated, and Durable. Thus, before a transaction is committed, several write transactions can be in progress at the same time in parallel. Some types of write transactions can involve a "read-modify-write" process, requiring a step of reading a last committed value, modifying the last committed value, and writing the modified value. Because transactions must be atomic, consistent, isolated, and durable, conflicts between read transactions and write transactions can occur. Subsequently, it would be necessary to serialize read and write transactions.

SUMMARY OF THE INVENTION

A temporal database system, method, and computer-readable storage medium in which a database is provided with sets of entities defined by initial tuples having a set ID, a unique timestamp, and a member increment. A write transaction is performed for sets of entities, wherein the write transaction designates the set by said set ID and produces an increment, wherein the increment is a number of entities to be added to or removed from the designated respective set of entities. New tuples including the set ID, the increment, and a new unique timestamp are created for the write transaction. Following the write transaction, an asynchronous compaction operation is performed on the new tuples. The compaction operation aggregates the increment of each new tuple into summary point counts. The compaction operation facilitates efficient queries without contention with write transactions.

BRIEF DESCRIPTION OF THE DRAWINGS

FIG. 5 is an example index;

FIG. 6 is an example read transaction performed on the index of FIG. 5;

FIGS. 7A, 7B are an example of compaction performed on the index of FIG. 5;

FIGS. 8A, 8B are an example of parallel transactions performed using the index write transactions.

DETAILED DESCRIPTION OF THE INVENTION

A common query in a temporal database is whether there are any entities in a set at a certain point in time. Records resulting from transactions performed on a temporal database can quickly accumulate to several hundreds, and to billions, of records over time. It is desirable to have a capability to efficiently perform this common query even in the case of an ever increasing temporal database. In addition, it is desirable to perform transactions in parallel without contention.

An approach to handling such queries is to create an explicit membership index. An explicit membership index may be stored that records for each entity-set pair the times when the membership starts and ends. Such an index may be stored sorted by set. Subsequently, to determine if a set is empty, a query can be performed over a range of time for a set, which can be referred to as a range query.

Alternatively, for each set, the latest member count and the time intervals when the set is not empty can be stored as a count index.

In order to ensure serializable isolation, database systems can perform transactions with locks, or without locks (optimistic by performing multiversion concurrency). Performing transactions with locking involves acquiring write and read locks on the affected data. Performing transactions with locking ensures that there are no conflicts, by not running potentially conflicting transactions in parallel. Performing transactions without locks can be serialized by performing the transaction, and at commit time, verifying that no conflicts occurred. If a conflict occurs, the commit fails. Multiversion concurrency resolves conflicts by rejecting all but one of competing transactions.

Combinations of these forms of indexing and serialization do not work in practice. Range indexing with locking causes contention between writes to a set and reads of the index data. Range indexing with optimistic transactions causes frequent transaction failure due to conflicts between reads and writes on the index data. Count indexing with locking causes contention on the counters between writes. Count indexing with optimistic transactions causes transaction failure due to conflicts between writes on the counter.

An index is provided that is a counter-like index that allows contention-free non-optimistic updates, and queries with a low probability of contention, while maintaining serializable isolation.

Figure 1:
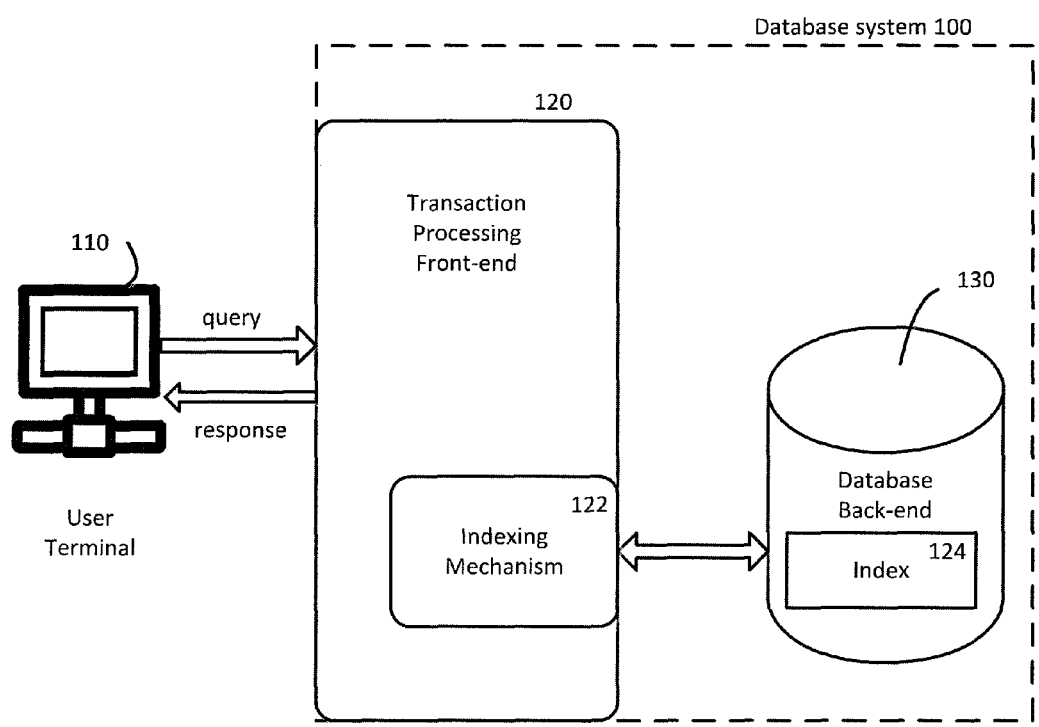
FIG. 1 is a system block diagram.
Figure 9:
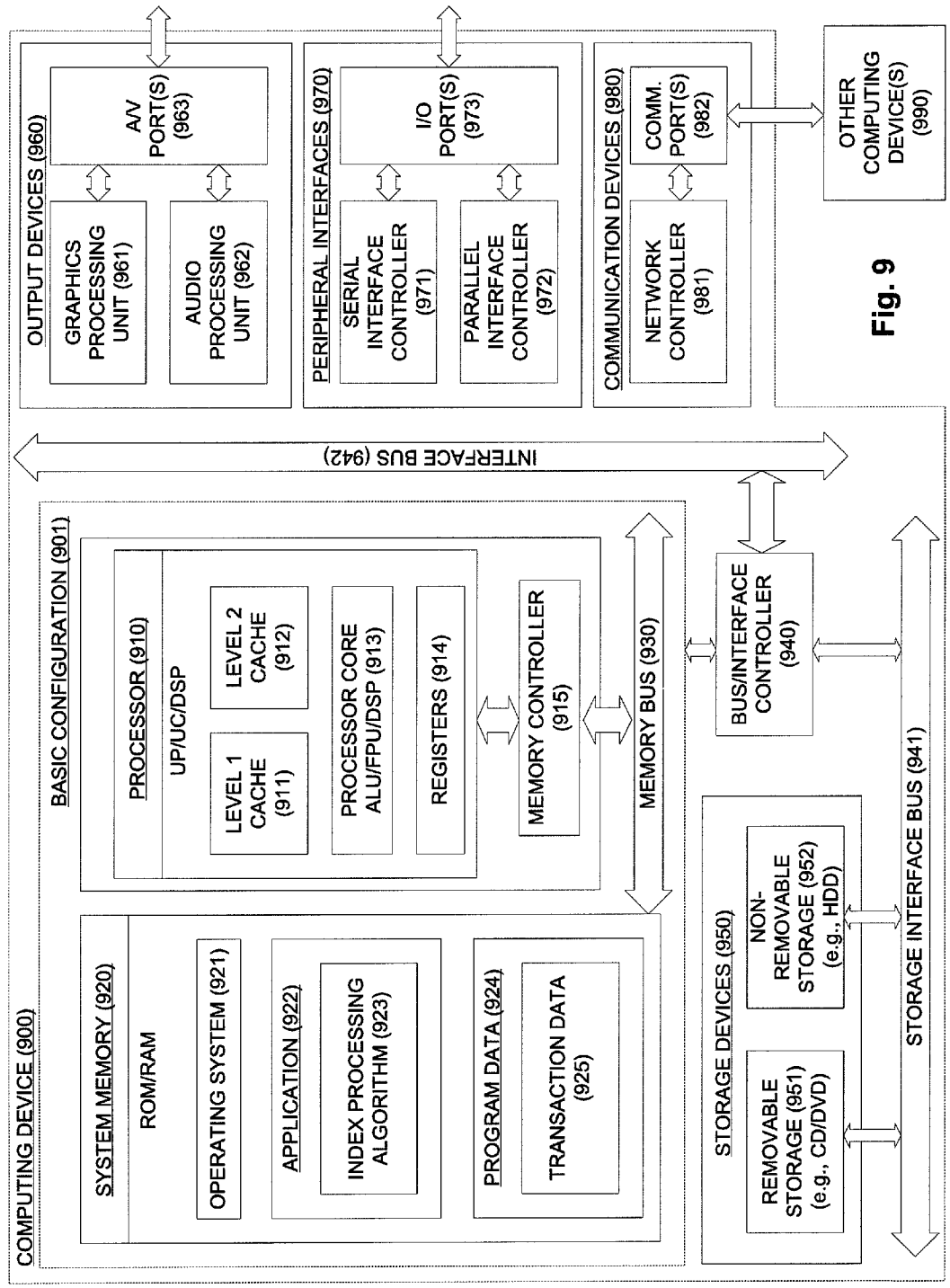
FIG. 9 is an example computer for performing the database index.

FIG. 1 is a block diagram for a transaction-processing-type database system. In an embodiment, one or more user terminals 110 submit queries that invoke transaction processing in a database system 100 having a database back-end 130 and a transaction processing front-end 120. Read-type queries will typically result in a response being sent to the user terminal 110 that submitted the query. In an alternative embodiment, queries may be received from automatic processes performed by an external network of computers. The transaction processing front-end 120 can include an indexing mechanism 122 that manages an index 124 stored in the database back-end 130. Depending on the extent of the database, the database back-end 130 may consist of a network of computers, or may be contained on the same machine as the transaction processing front-end 120. The transaction processing front-end 120 may itself consist of a network of computers. It is also possible that the both the transaction processing front-end 120 and the database back-end 130 reside in the user terminal 110. FIG. 9, which will be described later, is an example of a computer that can be used to implement a user terminal 110, a transaction processing front-end 120, and a database back-end 130.

A query may invoke a write transaction process on the index 124. A write transaction on the index 124 is performed by the index mechanism 122 by computing how the transaction changes the member count of each set of entities, by counting add and remove operations. The count of add and remove operations is represented as an increment. The increment of each affected set is written to the index 124. When a write transaction is completed successfully, the write transaction is committed to the index 124. Only one transaction is committed per logical timestamp. Since a logical timestamp is unique, there will not be any contention with other write transactions. Also, the write transaction does not need to read the index before updating it. Thus, the index mechanism 122 operates such that there is also no contention between write transactions and read transactions.

A record for a write transaction consists of a set ID, commit timestamp, and an increment value. FIG. 5 shows an example of an index 124 for two sets "Bigtown" and "Smallville." Entries labeled "increment" are examples of results of write transactions on the index 124.

A query from a user terminal 110 may be processed as a read transaction from the index 124. A read transaction specifies a set ID and a read time. In carrying out a read transaction, a range scan is performed on the index 124 and increments are summed up. A range scan involves a scan of the index over a range of timestamps. A range scan can be performed either as a forward scan in increasing order of time, or performed as a reverse scan in reverse order of time. The read transaction requires a read lock on the part of the index for a particular set of entities and for timestamps older than the query. However, read locks do not exclude other read locks. Because queries refer to committed timestamps and write transactions refer to uncommitted timestamps, the index mechanism 122 operates such that there is no contention between read transactions and write transactions.

In order to improve efficiency, after a write transaction, an asynchronous compaction is performed at a time after the write transaction has been committed. Compaction competes for locks with read transactions. In particular, compaction briefly locks a part of the index. However, after the compaction, future read transactions will be performed faster, as the index is reduced in size. Compaction involves replacement of increments with summary points. Summary points represent a summation of a set of increments. As will be described later, summary points adhere to a certain criteria. Compaction can be done per set of entities, so there is no single transaction locking large amounts of data for a long time. Furthermore, it is possible to find the latest summary point before the transaction or remember some last known summary point in a cache. In such case, only timestamps newer than a summary point need to be locked, such that there is no contention with reads at earlier timestamps.

By writing increments during write transactions and performing compaction later, the index mechanism 122 enables parallel transactions, where multiple write transactions are performed at the same time.

FIGS. 8A and 8B show an example of parallel transactions. In the example, a set "x" contains 100 entities at time 1. A transaction A adds 5 entities at time 3. A transaction B removes 59 entities at time 2.

Transaction A can write an increment "+5" while transaction B is still in progress. As can be seen in the timeline of FIG. 8A, although transaction B is not committed (in progress), the index will still be correct. Alternatively, as can be seen in timeline of FIG. 8B, if the transaction B is committed, the index will be correct.

Without the index mechanism 122, transaction A would have to write:

("x", 3) 105 if B is not committed (for the sum of 100+5), or would have to write:

("x", 3) 46 if transaction B is committed (for the sum of 100+5−59). In such case, transaction A would have to wait for transaction B, and it would not be possible to perform the transactions in parallel.

Figure 2:
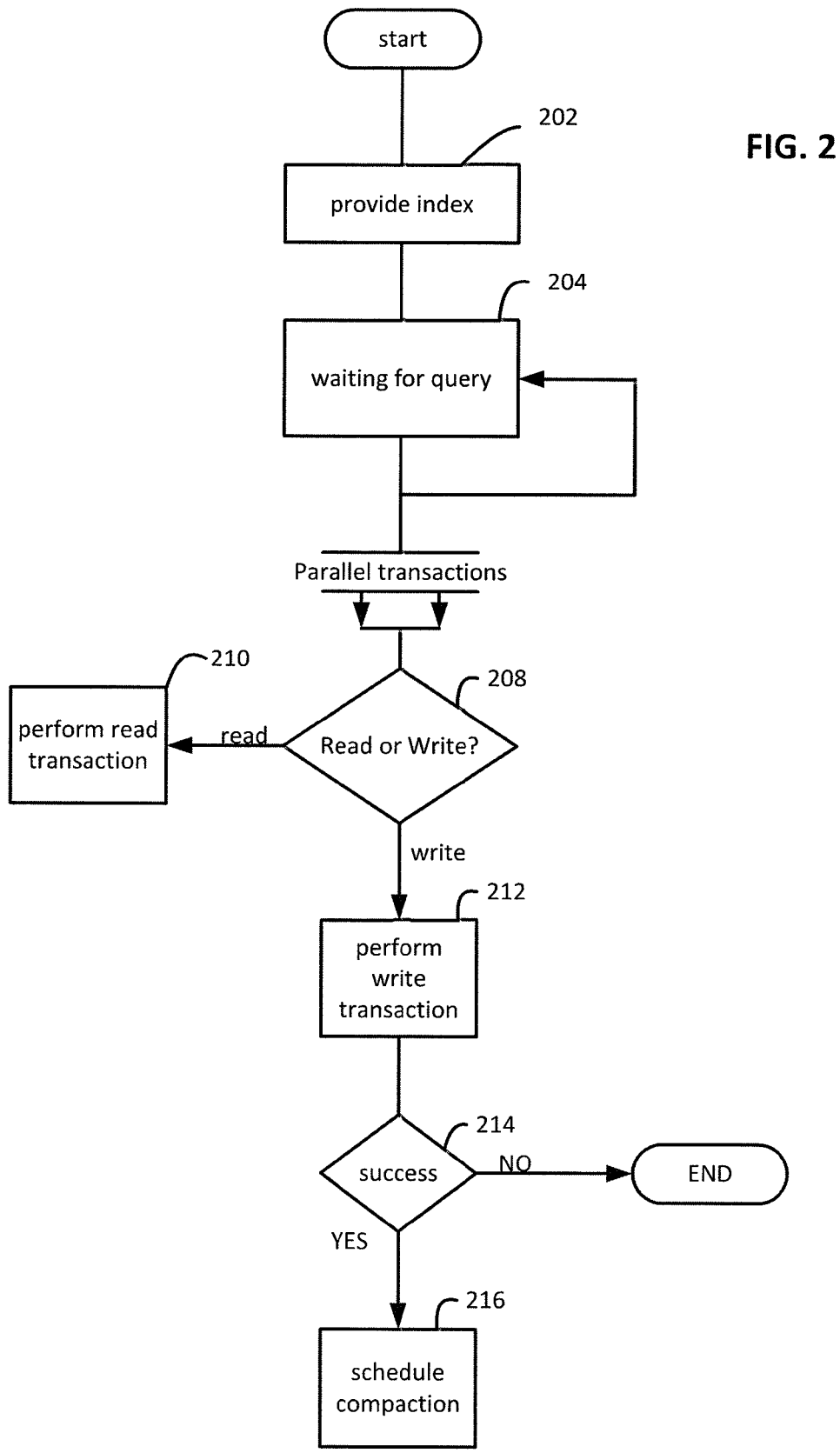
FIG. 2 is a flowchart for operation on an index of sets of entities over time.

FIG. 2 is a flowchart of transaction processing that involves the index mechanism 122. The flowchart assumes an initial index 124 provided at step 202, having one or more summary points and possibly some increments. It is also possible that an initial index may have no summary points. In an embodiment, a new index can be provided with a start summary point zero as a default. A transaction begins when a query is received. At step 204, the index mechanism 122 is waiting for a query. As explained above, several transactions may be started in parallel. Parallel transactions occur when at least two transactions are being processed at the same time. The index mechanism 122 insures that only one transaction is committed per each logical timestamp.

At step 208, when a query is entered, a determination is made as to whether the query is a read transaction or a write transaction. When the transaction is a read transaction, a read transaction is performed at step 210. When the transaction is a write transaction, a write transaction is performed at step 212. When the write transaction is successful (YES at step 214), at step 216 an asynchronous compaction process will be performed. Because the write transaction is separate from the compaction process, the write transaction does not require performing a read on the index, and will not conflict with a read transaction.

Figure 4:
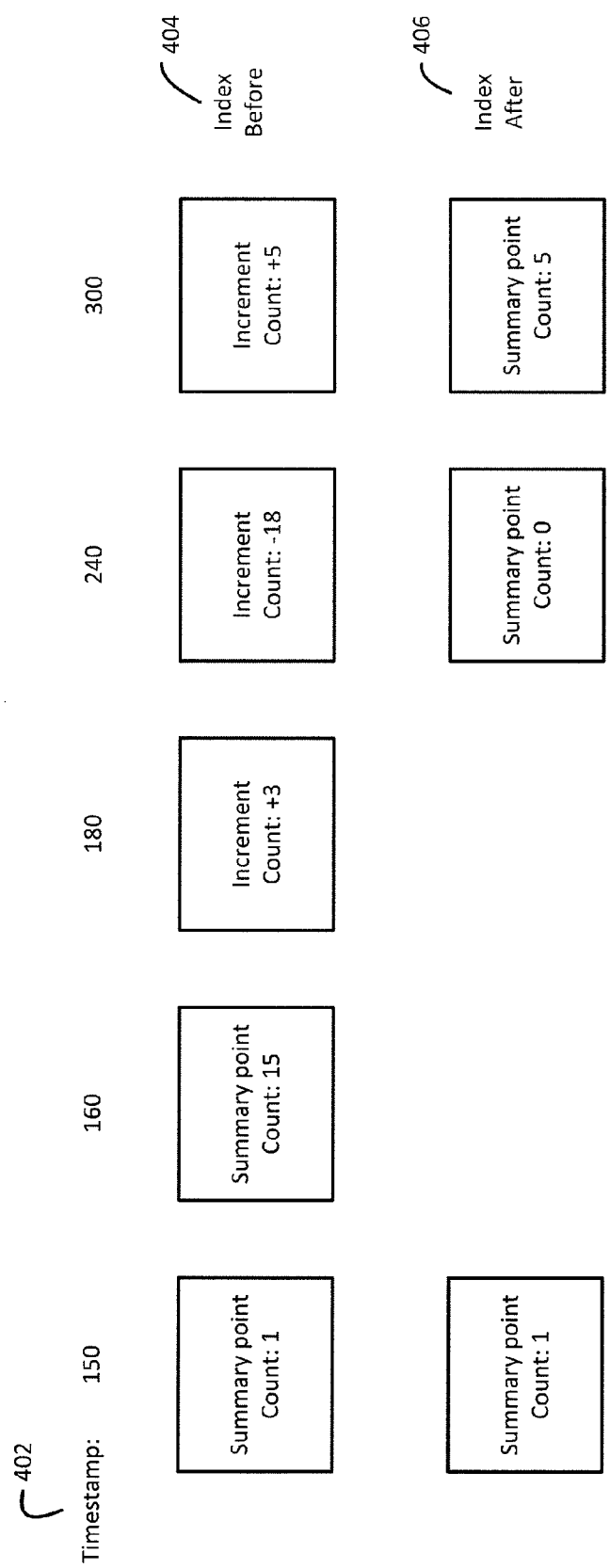
FIG. 4 is an example compaction operation.

FIG. 4 shows an example of compaction of a set. The index for the set contains summary points and increments. The top row 402 of FIG. 4 shows logical timestamps. The second row 404 shows the index before the compaction operation. The third row 406 shows the index as a result of the compaction operation. A compaction operation is asynchronous and is performed after completion of a successful write transaction (after the write transaction has been committed). Although a compaction operation competes with read transactions for locks, a compaction operation reduces the amount of information that a read transaction would have to process. Also, compaction operation is performed per set, such that there is no single transaction locking large amounts of data for a long time.

Compaction results in the following properties of an index: (1) an increment will not be followed by a summary point in time; (2) there will not be two consecutive summary points that have the same "emptiness" (where either both summary points are empty, or both summary points are non-empty), with the exception of the most recent summary point.

A compaction operation picks a (recent) timestamp. In the case of the index shown in FIG. 4, the compaction operation picks timestamp 300.

A compaction operation performs a range scan, in which all read increments are replaced by a set of summary points. Summary points are written to the index based on criteria including: (a) written at timestamps when the set becomes non-empty, (b) written at timestamps when the set becomes empty, and (c) written at the most recent increment. A reverse range scan is performed by reading the index going backwards in time, and summing up the increments until a summary point is reached. In an embodiment, a forward range scan can be performed by reading the index going forwards in time. In addition to the above criteria (a) to (c), a criterion (d) is that a compaction operation will remove the summary point that it reaches during a reverse scan, unless the summary point is the very first in the index or has an "emptiness" different from the preceding summary point. In the case of the index shown in FIG. 4, the set becomes "empty" at timestamp 240. Thus, a summary point is written at timestamp 240. A summary point is written at the chosen timestamp 300. The resulting index is a summary point at timestamp 150, a summary point at timestamp 240, and a summary point at timestamp 300.

Figure 3C:
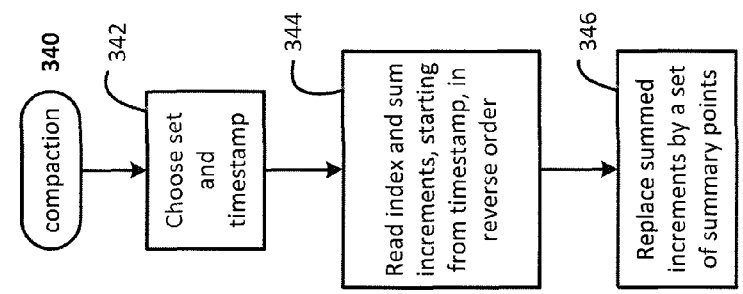
FIGS. 3A, 3B, 3C are flowcharts for transaction operations.
Figure 3B:
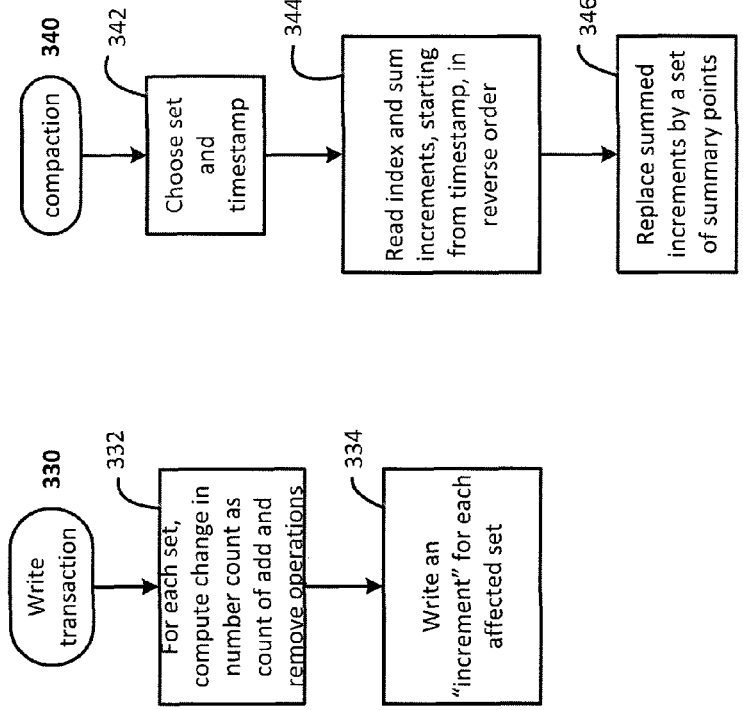
Figure 3A:
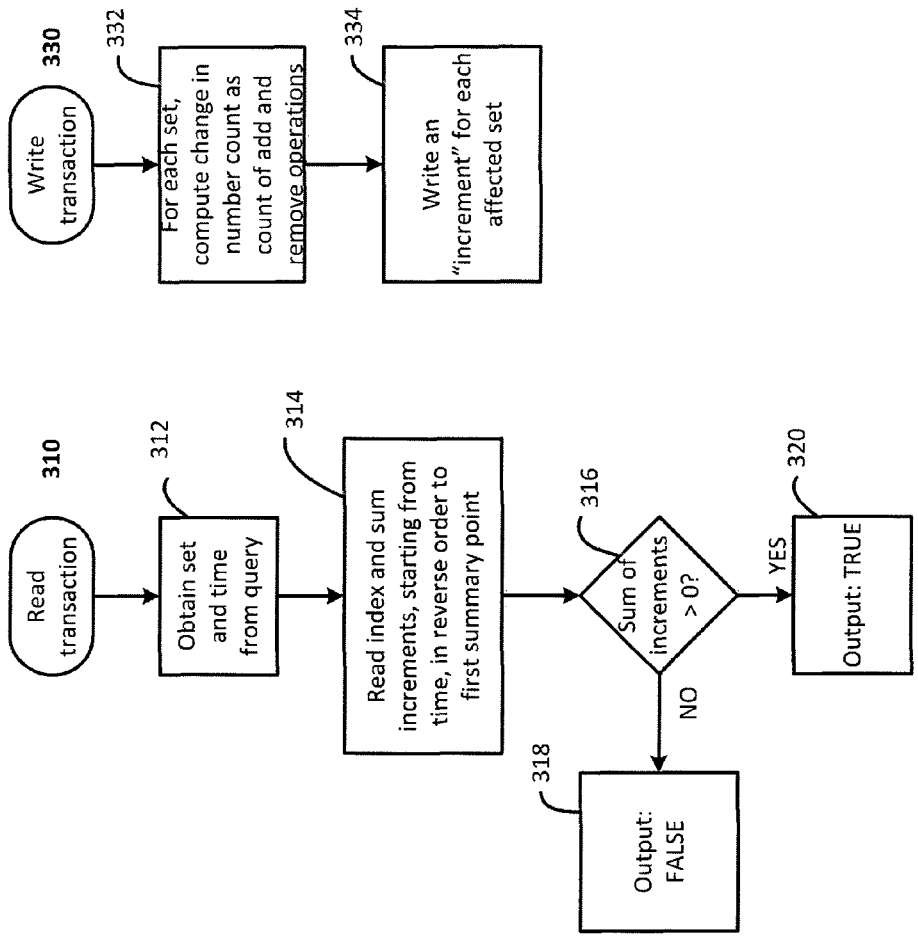

Details of a read transaction 310, write transaction 330, and compaction 340 are shown in FIGS. 3A, 3B, and 3C. For the sake of illustration, an example read transaction, write transaction, and compaction will be described using data shown in FIG. 5, FIG. 6, and FIGS. 7A, 7B. FIG. 5 shows an example index for two sets, "Bigtown" and "Smallville." FIG. 6 shows an example read transaction. FIGS. 7A, 7B show an example of compaction on the index shown in FIG. 5. The example indexes have a "SetID", "Valid time", "entry", and "value". The "SetID" is a unique identifier for a set of entities. The "Valid time" is a logical transaction time, as well as a time that pertains to the value. The "entry" indicates a type of entry in the index. In this example, the "value" indicates the number of citizens (or change in the number of citizens) in a town identified by the "SetID."

In the case of a read transaction, a query specifies a set and a time.

An example query is shown in FIG. 6, as: Was anyone living in Smallville in 1996?

At step 312, the set ID and time are obtained from the query ("Smallville", 1996). At step 314, the index is read and increments are summed, starting from the time (1996), in reverse order until the first summary point is reached (summary point at 1950). At step 316, it is determined whether the sum of increments to the first reached summary point is greater than zero. When the sum of increments is determined to be greater than zero ("YES"), the response to the query is "TRUE" 320, meaning, with respect to the example query, that the set is not empty at time 1996.

When the sum of increments is determined to be zero ("NO"), the response to the query is "FALSE" 318, meaning that the set is empty at time 1996. In the example query in FIG. 6, the sum of increments to the first summary point is zero. Thus, there was no one living in Smallville in 1996.

In the case that an index does not contain any summary points, a read transaction will read the index until it reaches the beginning of the index. As an alternative, an initial index can be created to include a summary point zero at the beginning of the index.

In the case of a write transaction 330, for each affected set, at step 332 compute a change in number count by counting the add and remove operations. At step 334, the write transaction writes an "increment" for each affected set. Also, for each set, the write transaction commits only one transaction per logical timestamp.

In particular, while a write transaction is running, the index mechanism determines a logical timestamp that is unique for the transaction. A write transaction is considered as "successful" when it is committed. However, it is possible for one write transaction to be committed while some other write transaction having an earlier timestamp is still running. Modifications by the committed write transaction will not be immediately available for a read transaction until the other write transaction having the earlier timestamp either commits or fails. Also, the logical timestamp for a write transaction may be a timestamp that is near the time of completion of the transaction. A read transaction requesting the state of the index at the time of a logical timestamp will include the effect of the transaction, but will be delayed by the index mechanism until the write transaction has completed.

In the case of a compaction operation 340, at step 342 the compaction operation picks a (recent) timestamp. FIG. 7A shows an example compaction operation performed on the index in FIG. 5. In the example of FIG. 5, the compaction operation picks a timestamp 2000 for set "Smallville."

Similar to a read transaction 310, at step 344 the compaction operation reads the index and sums increments, for example starting from the picked timestamp 2000, in reverse order. At step 346, the compaction operation replaces summed increments by a set of summary points. Performing the compaction operation using criteria (a) to (d), the resulting index is shown in FIG. 7A.

FIG. 7B shows the read transaction, but performed after the compaction operation. In the read transaction, the compacted index is read from ("Smallville", 0) to ("Smallville", 1996) in reverse order. As can be seen in FIG. 7B, the summary point at 1995 has a count of zero. Thus, the response to the query is that there was no one living in Smallville in 1996.

Embodiments described thus far presume a criteria of set emptiness in determining summary points. In performing write transactions, increments are determined by summing up entities that are added and entities that are removed from a set. During compaction, summary points are written at timestamps where a set becomes empty, or at timestamps where a set becomes non-empty. As an alternative, summary points can be written at timestamps when a count goes above a particular threshold or goes below a particular threshold. In such case, a threshold of zero would correspond to the set emptiness criteria (a) to (c), above.

Provided a predetermined threshold as an alternative criterion for writing summary points, the index could be used to answer such queries as—Did at least 100,000 people live in a particular city at a particular time? In this example query, the predetermined threshold would be 100,000.

FIG. 9 is a block diagram illustrating an example computing device 900 that is arranged for a user terminal, a transaction processing front-end, and/or a database backend in accordance with the present disclosure. In a very basic configuration 901, computing device 900 typically includes one or more processors 910 and system memory 920. A memory bus 930 can be used for communicating between the processor 910 and the system memory 920.

Depending on the desired configuration, processor 910 can be of any type including but not limited to a microprocessor (µP), a microcontroller (µC), a digital signal processor (DSP), or any combination thereof. Processor 910 can include one more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 includes an index processing algorithm 923. Program Data 924 includes transaction processing data. In some embodiments, application 922 can be arranged to operate with program data 924 on an operating system 921. This described basic configuration is illustrated in FIG. 9 by those components within dashed line 901.

Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include an interface bus 942 for facilitating communication from various interface devices (e.g., output interfaces, peripheral interfaces, and communication interfaces) to the basic configuration 901 via the bus/interface controller 940. Example output devices 960 include a graphics processing unit 961 and an audio processing unit 962, which can be configured to communicate to various external devices such as a display or speakers via one or more A/V ports 963. Example peripheral interfaces 970 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which can be arranged to facilitate communications with one or more other computing devices 990 over a network communication via one or more communication ports 982. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency trade-offs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method for a temporal database system, comprising:
    providing the temporal database with at least one set of entities defined by initial tuples having a set ID and a first unique timestamp;
    performing at least two parallel write transactions for respective sets of the at least one set of entities, wherein each write transaction designates the respective set by said set ID and produces an increment, wherein the increment is a number of entities to be added to or removed from the designated respective set of entities;
    creating new tuples including the set ID, the increment, and a second unique timestamp for each write transaction, the second unique timestamp being a time within a predetermined time period before completion of each respective write transaction, wherein said creating is performed before completion of the parallel write transactions; and
    performing a compaction operation on the new tuples upon completion of the parallel write transactions that created the new tuples, wherein the compaction operation aggregates the increment of each new tuple into summary point counts.

2. The computer-implemented method of claim 1, further comprising a predetermined threshold, wherein the summary point counts are at points where aggregated increments exceed the threshold or drop below the threshold.

3. The computer-implemented method of claim 1, wherein the compaction operation comprises:
    selecting a set, from the at least one set of entities, and a compaction timestamp, the compaction timestamp being selected from among the second unique timestamps that have been created after the first unique timestamps of the initial tuples;
    reading the initial tuples and the new tuples and aggregating respective increments, beginning from the compaction timestamp, in order of reverse time;
    replacing the read initial and new tuples with the aggregated increments in a set of summary point counts.

4. The computer-implemented method of claim 3, wherein the set of summary point counts are at points where the aggregated increments change between zero and non-zero counts.

5. The computer-implemented method of claim 1, wherein during the creating, new tuples including the set ID, the increment, and a second unique timestamp are created for each of the at least two write transactions.

6. The computer-implemented method of claim 1, further comprising performing a read transaction that requests a count of entities contained in a set of entities at a specified time point, wherein the read transaction comprises:
    reading the initial tuples and the new tuples and aggregating respective increments, beginning from the specified time point, in order of reverse time until a first summary point count or a first of the initial and the new tuples in time is reached;
    providing the aggregated increments as the requested count.

7. The computer-implemented method of claim 1, wherein at least one said set of entities is a directory, and the entities contained in the directory are files.

8. The computer-implemented method of claim 7, wherein transitive subdirectories as the at least one said set of entities are related as hierarchical subdirectories logically related to a root directory, wherein some of the transitive subdirectories contain files, while others of the transitive subdirectories in the hierarchy are empty.

9. The computer-implemented method of claim 8, further comprising performing a read transaction that requests whether a directory or subdirectory among the transitive subdirectories contains any files at a specified time point, wherein the read transaction comprises:
    reading the initial tuples and the new tuples and aggregating respective increments, beginning from the specified time point, in order of reverse time until a first summary point count or a first of the initial and the new tuples in time is reached;
    providing, as a response to the request, an indication that a count of the aggregated increments is zero or non-zero.

10. The computer-implemented method of claim 1, wherein the entities are files having relative paths, wherein a relative path for each file includes a sequence of names of one or more directories.

11. The computer-implemented method of claim 1, wherein at least one said set of entities is a directory, and the entities contained in the directory are files, and wherein the compaction comprises:
    for each directory,
    selecting a directory and a compaction timestamp, the compaction timestamp being selected from among the second unique timestamps that have been created after the first unique timestamps of the initial tuples;
    reading the initial tuples and the new tuples of the respective directory and aggregating respective increments, beginning from the compaction timestamp, in order of reverse time;
    replacing the read tuples of the respective directory with the aggregated increments in a set of summary point counts.

12. The computer-implemented method of claim 11, wherein transitive subdirectories as the at least one said set of entities are related as hierarchical directories logically related to a root directory, wherein some of the transitive subdirectories contain files, while others of the transitive subdirectories in the hierarchy are empty.

13. The computer-implemented method of claim 1, wherein the entities are files having relative paths, wherein a relative path for each file includes a sequence of names of one or more directories, and wherein the compaction comprises:
for each directory name in relative paths of respective files,
selecting a directory name and a compaction timestamp, the compaction timestamp being selected from among the second unique timestamps that have been created after the first unique timestamps of the initial tuples;
reading the initial tuples and the new tuples of the respective directory name and aggregating respective increments, beginning from the compaction timestamp, in order of reverse time;
replacing the read initial and new tuples of the respective directory name with the aggregated increments in a set of summary point counts.

14. The computer-implemented method of claim 1, further comprising performing a read transaction that requests the count of entities contained in a set of entities at a specified time point, wherein the read transaction comprises:
reading the initial tuples and the new tuples and aggregating respective increments, over a range of timestamps;
providing the aggregated increments as the requested count.

15. The computer-implemented method of claim 14, wherein the reading over a range of timestamps is in increasing order of time.

16. A database system comprising:
one or more computer processors;
a processor-readable memory coupled to the one or more processors and having instructions stored thereon that, when executed by the one or more processors, cause the one or more processors to perform operations comprising:
providing the temporal database with at least one set of entities defined by initial tuples having a set ID and a first unique timestamp;
performing at least two parallel write transactions for respective sets of the at least one set of entities, wherein each write transaction designates the respective set by said set ID and produces an increment, wherein the increment is a number of entities to be added to or removed from the designated respective set of entities;
creating new tuples including the set ID, the increment, and a second unique timestamp for each write transaction, the second unique timestamp being a time within a predetermined time period before completion of each respective write transaction, wherein said creating is performed before completion of the parallel write transactions; and
performing a compaction operation on the new tuples upon completion of the parallel write transactions that created the new tuples, wherein the compaction operation aggregates the increment of each new tuple into summary point counts.

17. The database system of claim 16, further comprising a predetermined threshold, wherein the summary point counts are at points where aggregated increments exceed the threshold or drop below the threshold.

18. The database system of claim 16, wherein the compaction operation comprises:
selecting a set, from the at least one set of entities, and a compaction timestamp, the compaction timestamp being selected from among the second unique timestamps that have been created after the first unique timestamps of the initial tuples;
reading the initial tuples and the new tuples and aggregating respective increments, beginning from the compaction timestamp, in order of reverse time;
replacing the read initial and new tuples with the aggregated increments in a set of summary point counts.

19. The database system of claim 18, wherein the set of summary point counts are at points where said aggregated increments change between zero and non-zero counts.

20. The database system of claim 16, wherein during the creating, new tuples including the set ID, the increment, and a second unique timestamp are created for each of the at least two write transactions.

21. The database system of claim 16, further comprising performing a read transaction that requests a count of entities contained in a set of entities at a specified time point, wherein the read transaction comprises:
reading the initial tuples and the new tuples and aggregating respective increments, beginning from the specified time point, in order of reverse time until a first summary point count or a first of the initial and the new tuples in time is reached;
providing the aggregated increments as the requested count.

22. The database system of claim 16, wherein at least one said set of entities is a directory, and the entities contained in the directory are files.

23. The database system of claim 22, wherein transitive subdirectories as the at least one said set of entities are related as hierarchical subdirectories logically related to a root directory, wherein some of the transitive subdirectories contain files, while others of the transitive subdirectories in the hierarchy are empty.

24. The database system of claim 23, further comprising performing a read transaction that requests whether a directory or subdirectory among the transitive subdirectories contains any files at a specified time point, wherein the read transaction comprises:
reading the initial tuples and the new tuples and aggregating respective increments, beginning from the specified time point, in order of reverse time until a first summary point count or a first of the initial and the new tuples in time is reached;
providing, as a response to the request, an indication that a count of the aggregated increments is zero or non-zero.

25. The database system of claim 16, wherein the entities are files having relative paths, wherein a relative path for each file includes a sequence of names of one or more directories.

26. The database system of claim 16, wherein at least one said set of entities is a directory, and the entities contained in the directory are files, and wherein the compaction comprises:
for each directory,
selecting a directory and a compaction timestamp, the compaction timestamp being selected from among the second unique timestamps that have been created after the first unique timestamps of the initial tuples;
reading the initial tuples and the new tuples of the respective directory and aggregating respective increments, beginning from the compaction timestamp, in order of reverse time;
replacing the read tuples of the respective directory with the aggregated increments in a set of summary point counts.

27. The database system of claim 26, wherein transitive subdirectories as the at least one said set of entities are related as hierarchical directories logically related to a root directory, wherein some of the transitive subdirectories contain files, while others of the transitive subdirectories in the hierarchy are empty.

28. The database system of claim 16, wherein the entities are files having relative paths, wherein a relative path for each file includes a sequence of names of one or more directories, and wherein the compaction comprises:
  for each directory name in relative paths of respective files,
    selecting a directory name and a compaction timestamp, the compaction timestamp being selected from among the second unique timestamps that have been created after the first unique timestamps of the initial tuples;
    reading the initial tuples and the new tuples of the respective directory name and aggregating respective increments, beginning from the compaction timestamp, in order of reverse time;
    replacing the read initial and new tuples of the respective directory name with the aggregated increments in a set of summary point counts.

29. The database system of claim 16, further comprising performing a read transaction that requests the count of entities contained in a set of entities at a specified time point, wherein the read transaction comprises:
  reading the initial tuples and the new tuples and aggregating respective increments, over a range of timestamps;
  providing the aggregated increments as the requested count.

30. The database system of claim 29, wherein the reading over a range of timestamps is in increasing order of time.

31. A non-transitory computer-readable storage medium storing a computer program that, when executed by a computer performs steps of:
  providing the temporal database with at least one set of entities defined by initial tuples having a set ID and a first unique timestamp;
  performing at least two parallel write transactions for respective sets of the at least one set of entities, wherein each write transaction designates the respective set by said set ID and produces an increment, wherein the increment is a number of entities to be added to or removed from the designated respective set of entities;
  creating new tuples including the set ID, the increment, and a second unique timestamp for each write transaction, the first unique timestamp being a time within a predetermined time period before completion of each respective write transaction, wherein said creating is performed before completion of the parallel write transactions; and
  performing a compaction operation on the new tuples upon completion of the parallel write transactions that created the new tuples, wherein the compaction operation aggregates the increment of each new tuple into summary point counts.

32. The non-transitory computer-readable storage medium of claim 31, further comprising a predetermined threshold, wherein the summary point counts are at points where aggregated increments exceed the threshold or drop below the threshold.

33. The non-transitory computer-readable storage medium of claim 31, wherein the compaction operation comprises:
  selecting a set, from the at least one set of entities, and a compaction timestamp, the compaction timestamp being selected from among the second unique timestamps that have been created after the first unique timestamps of the initial tuples;
  reading the initial tuples and the new tuples and aggregating respective increments, beginning from the compaction timestamp, in order of reverse time;
  replacing the read tuples with the aggregated increments in a set of summary point counts.

34. The non-transitory computer-readable storage medium of claim 33, wherein the set of summary point counts are at points where the aggregated increments change between zero and non-zero counts.

35. The non-transitory computer-readable storage medium of claim 31, wherein during the creating, new tuples including the set ID, the increment, and a second unique timestamp are created for each of the at least two write transactions.

36. The non-transitory computer-readable storage medium of claim 31, further comprising performing a read transaction that requests a count of entities contained in a set of entities at a specified time point, wherein the read transaction comprises:
  reading the initial tuples and the new tuples and aggregating respective increments, beginning from the specified time point, in order of reverse time until a first summary point count or a first of the initial and the new tuples in time is reached;
  providing the aggregated increments as the requested count.

37. The non-transitory computer-readable storage medium of claim 31, wherein at least one said set of entities is a directory, and the entities contained in the directory are files.

38. The non-transitory computer-readable storage medium of claim 37, wherein transitive subdirectories as the at least one said set of entities are related as hierarchical subdirectories logically related to a root directory, wherein some of the transitive subdirectories contain files, while others of the transitive subdirectories in the hierarchy are empty.

39. The non-transitory computer-readable storage medium of claim 38, further comprising performing a read transaction that requests whether a directory or subdirectory among the transitive subdirectories contains any files at a specified time point, wherein the read transaction comprises:
  reading the initial tuples and the new tuples and aggregating respective increments, beginning from the specified time point, in order of reverse time until a first summary point count or a first of the initial and the new tuples in time is reached;
  providing, as a response to the request, an indication that a count of the aggregated increments is zero or non-zero.

40. The non-transitory computer-readable storage medium of claim 31, wherein the entities are files having relative paths, wherein a relative path for each file includes a sequence of names of one or more directories.

41. The non-transitory computer-readable storage medium of claim 31, wherein at least one said set of entities is a directory, and the entities contained in the directory are files, and wherein the compaction comprises:
  for each directory,
    selecting a directory and a compaction timestamp, the compaction timestamp being selected from among the second unique timestamps that have been created after the first unique timestamps of the initial tuples;
    reading the initial tuples and the new tuples of the respective directory and aggregating respective increments, beginning from the compaction timestamp, in order of reverse time;

replacing the read tuples of the respective directory with the aggregated increments in a set of summary point counts.

42. The non-transitory computer-readable storage medium of claim 31, wherein transitive subdirectories as the at least one said set of entities are related as hierarchical directories logically related to a root directory, wherein some of the transitive subdirectories contain files, while others of the transitive subdirectories in the hierarchy are empty.

43. The non-transitory computer-readable storage medium of claim 31, wherein the entities are files having relative paths, wherein a relative path for each file includes a sequence of names of one or more directories, and wherein the compaction comprises:

for each directory name in relative paths of respective files,
selecting a directory name and a compaction timestamp, the compaction timestamp being selected from among the second unique timestamps that have been created after the first unique timestamps of the initial tuples;
reading the initial tuples and the new tuples of the respective directory name and aggregating respective increments, beginning from the compaction timestamp, in order of reverse time;
replacing the read tuples of the respective directory name with the aggregated increments in a set of summary point counts.

44. The non-transitory computer-readable storage medium of claim 31, further comprising performing a read transaction that requests the count of entities contained in a set of entities at a specified time point, wherein the read transaction comprises:

reading the initial tuples and the new tuples and aggregating respective increments, over a range of timestamps;
providing the aggregated increments as the requested count.

45. The non-transitory computer-readable storage medium of claim 44, wherein the reading over a range of timestamps is in increasing order of time.

* * * * *